United States Patent [19]

Deutsch et al.

[11] 4,031,377

[45] June 21, 1977

[54] FAST MULTIPLIER CIRCUIT EMPLOYING SHIFT CIRCUITRY RESPONSIVE TO TWO BINARY NUMBERS THE SUM OF WHICH APPROXIMATELY EQUALS THE MANTISSA OF THE MULTIPLIER

[75] Inventors: Ralph Deutsch, Sherman Oaks; Glen R. Griffith, Westminster, both of Calif.

[73] Assignee: Nippon Gakki Seizo Kabushiki Kaisha, Hamamatsu, Japan

[22] Filed: Aug. 25, 1975

[21] Appl. No.: 607,141

[52] U.S. Cl. .............................................. 235/164
[51] Int. Cl.² ......................................... G06F 7/54
[58] Field of Search .................................... 235/164

[56] References Cited

UNITED STATES PATENTS

| | | |
|---|---|---|
| 3,489,888 | 1/1970 | Wilhelm, Jr. et al. ............. 235/164 |
| 3,691,359 | 9/1972 | Dell et al. ......................... 235/164 |
| 3,696,235 | 10/1972 | Tufts et al. ..................... 235/164 X |
| 3,800,130 | 3/1974 | Martinson ...................... 235/164 X |
| 3,919,535 | 11/1975 | Vattuone .......................... 235/164 |

OTHER PUBLICATIONS

C. Ghest "Multiplying Made Easy For Digital Assemblies" *Electronics* pp. 56–61 Nov. 22, 1971.
R. L. Haven "Multiplying Circuit" Western Electric Technical Digest No. 26 pp. 37–38 Apr. 1972.

*Primary Examiner*—David H. Malzahn
*Attorney, Agent, or Firm*—Howard A. Silber

[57] ABSTRACT

A multiplier for multiplying a fixed point multiplicand by a floating point multiplier utilizes decode logic which provides control signals related to two numbers, the sum of which is approximately equal to the mantissa of the multiplier. The multiplicand is separately left shifted in two circuits, responsive to the control signals, by a number of places respectively corresponding to the values of said two numbers. The shift circuit outputs are summed algebraically in an adder. The sum is then shifted by a number of places and in a direction determined respectively by the magnitude and sign of the power of the floating point multiplier. The result is a close approximation of the desired multiplication product. The multiplier advantageously is employed in an electronic musical instrument.

11 Claims, 4 Drawing Figures

FAST MULTIPLIER CIRCUIT EMPLOYING SHIFT CIRCUITRY RESPONSIVE TO TWO BINARY NUMBERS THE SUM OF WHICH APPROXIMATELY EQUALS THE MANTISSA OF THE MULTIPLIER

BACKGROUND OF THE INVENTION

1. Field of the Invention

The present invention relates to a multiplier circuit useful in a computor organ.

2. Description of the Prior Art

In the COMPUTOR ORGAN disclosed in U.S. Pat. No. 3,809,786 to Deutsch, musical tones are generated by computing in real time the amplitudes $X_o(qR)$ at successive sample points ($qR$) of a musical waveshape. Each sample point amplitude is obtained by individually calculating the constituent Fourier component contributions $F^{(n)}$ and summing these in an accumulator to obtain $$X_o(qR) = \sum_{n=1}^{W} F^{(n)} \qquad \text{(Equation 1)}$$

where $n$ specifies the Fourier component order and W is the highest order component included in the waveshape synthesis. Each Fourier component is obtained in accordance with the relationship $$F^{(n)} = C_n \sin \frac{\pi}{W} nqR \qquad \text{(Equation 2)}$$

where $C_n$ is a harmonic amplitude coefficient that establishes the relative amplitude of the $n^{th}$ order component. The value R is a frequency number that is proportional to the fundamental frequency of the generated tone, and $q$ is an integer ($q=1,2,3 \ldots$) that is incremented at regular time intervals $t_x$, each time a subsequent sample point amplitude is computed.

As part of each calculation of $F^{(n)}$ in accordance with equation 2, a multiplication operation is performed wherein the value $C_n$ is multiplied by $\sin \pi/WnqR$. The appropriate sin value is obtained from a sinusoid table, that is, a memory which stores values of $\sin \phi$ over some range, say $0 < \phi < 2\pi$, at intervals of D, where D is the resolution constant of the memory.

Advantageously each sin value is stored as a fixed point binary number S. For example, the number S may have the form $$S = s_0 2^0 + s_1 2^{-1} + s_2 2^{-2} + s_3 2^{-3} + \ldots s_q 2^{-q} \qquad \text{(Eq. 3)}$$

where $s_0, s_1, s_2, \ldots, s_q$ each is a binary bit of value 0 or 1.

In the computor organ, the harmonic coefficient values $C_n$ are obtained from a set of such values stored in a harmonic coefficient memory. Because of the relatively large dynamic range of values, these coefficients $C_n$ advantageously are stored as floating point binary numbers. Such a number C may have the form $$C = (a_0 + a_1 2^{-1} + a_2 2^{-2} + a_2 2^{-2} + a_3 2^{-3} + \ldots + a_k 2^{-k}) 2^J \qquad \text{(Eq. 4)}$$

where the expression within the parenthesis is mantissa of C and where J is the power to which the mantissa is raised. Each bit $a_0, a_1, a_2, \ldots a_k$ in the mantissa has a value of 0 or 1. For the special case $C = 0$ the value $a_0 = 0$. For all non-zero values of C the term $a_0 = 1$. The power J may have the form $$J = (j_i 2^i + \ldots + j_3 2^3 + j_2 2^2 + j_1 2^1 + j_0 2^0) \qquad \text{(Eq. 5)}$$

where each bit $j_0, j_1, j_2 \ldots j_i$ has the value 0 or 1, and where the sign of J can be either positive or negative.

Since waveshape computation in the computor organ is carried out in real time, high speed circuitry is a requirement. Conventional multiplier circuits take many clock cycles to perform each multiplication, and hence are undesirable. An object of the present invention is to provide a very fast multiplier circuit for multiplying a fixed point binary number by a floating point binary number. The fixed point multiplicand S may have the form of equation 3, or S may be greater than or equal to zero and have the form $$S = s_q 2^q + \ldots + s_3 2^3 + s_2 2^2 + s_1 2^1 + s_0 2^0 \qquad \text{(Eq. 6)}$$

where each bit $s_0, s_1, s_2 \ldots sq$ is either 0 or 1. The floating point multiplier C has the form of equation 4 with an exponent as given in equation 5 or 6.

A further object is to provide such a multiplier circuit in which the products of successive multiplications are obtained at the logic clock rate. The individual products may be delayed by a number of clock pulse times because of the logic length of the multiplier. Use of the multiplier disclosed herein is by no means limited to a computor organ. The circuit is useful in any application where some accuracy can be sacrificed in favor of obtaining the multiplication product in a very minimum of logic clock cycles.

SUMMARY OF THE INVENTION

These and other objects are achieved by a multiplier circuit in which speed and simplicity are attained at the expense of a numerical error. The error is sufficiently small so that the multiplier can be used advantageously in an electronic musical instrument, and in most system control applications, however, it may not be accurate enough for numerical applications such as engineering or scientific computations.

The inventive circuit utilizes an approximation in the value of the mantissa of the floating point number. This is illustrated herein for the specific example where $$C = (1 + a_1 2^{-1} + a_2 2^{-2} + a_3 2^{-3}) 2^J \qquad \text{(Eq. 7)}$$

in which case $a_0 = 1$, or where $C=0$, in which case $a_0, a_1, a_2$ and $a_3$ all are zero. For this case, all of the possible values of the mantissa are listed below in Table I.

TABLE I

| $a_0$ | $a_1$ | $a_2$ | $a_3$ |
|---|---|---|---|
| 0 | 0 | 0 | 0 |
| 1 | 0 | 0 | 0 |
| 1 | 0 | 0 | 1 |
| 1 | 0 | 1 | 0 |
| 1 | 0 | 1 | 1 |
| 1 | 1 | 0 | 0 |
| 1 | 1 | 0 | 1 |
| 1 | 1 | 1 | 0 |
| 1 | 1 | 1 | 1 |

For all non-zero values of C, the mantissa can be written in the binary form listed below in the "binary" column of Table II. The decimal point is omitted.

TABLE II

| Mantissa in Binary | | | | Decimal Equivalent (E) of Mantissa | Exact Decomposition of Decimal Equivalent | Approximate Decomposition of Decimal Equivalent |
|---|---|---|---|---|---|---|
| $a_0$ | $a_1$ | $a_2$ | $a_3$ | | | x  y |
| 1 | 0 | 0 | 0 | 8 | 8 + 0 | 8 + 0 |
| 1 | 0 | 0 | 1 | 9 | 8 + 1 | 8 + 1 |

TABLE II-continued

| Mantissa in Binary | | | | Decimal Equivalent (E) of Mantissa | Exact Decomposition of Decimal Equivalent | Approximate Decomposition of Decimal Equivalent |
|---|---|---|---|---|---|---|
| 1 | 0 | 1 | 0 | 10 | 8 + 2  | 8 + 2  |
| 1 | 0 | 1 | 1 | 11 | 8 + 3  | *8 + 2 |
| 1 | 1 | 0 | 0 | 12 | 16 − 4 | 16 − 4 |
| 1 | 1 | 0 | 1 | 13 | 16 − 3 | *16 − 4 |
| 1 | 1 | 1 | 0 | 14 | 16 − 2 | 16 − 2 |
| 1 | 1 | 1 | 1 | 15 | 16 − 1 | 16 − 1 |

The decimal equivalent of the mantissa is listed in the second column of Table II. For the case illustrated, this decimal equivalent has the eight possible values of 8 through 15. In the third column, the decimal equivalent has been decomposed into a sum or difference of two numbers, the first of which is a power of 2. For mantissa decimal equivalents (E) ranging from 8 to 11, the decomposition is the sum of 8 plus the value (E−8); for mantissas between 12 and 15, the decomposition is the difference of 16 minus the value (16−E).

In the final column of Table II, the decimal equivalent of the mantissa has been decomposed like in the preceeding column, except that each term $x$, $y$ in the decomposition is zero or a power of 2. For all but two values of E, this decomposition is exact. For mantissas having the decimal equivalent values 11 and 13, the decomposition is an approximation, indicated by an asterisk in Table II. As an example, the mantissa 1101 has a decimal equivalent value E=13. The exact decomposition is (16−3). The approximate decomposition is $(x+y)$=16−4, where both $x$=16 and $y$=−4 are powers of two.

In the inventive multiplication circuit, the binary fixed point multiplicand S is multiplied by the approximate decomposition value listed in Table II. This is accomplished by supplying the multiplicand S to a pair of shift circuits. In the first shift circuit, the value S is left shifted by the number of positions necessary to accomplish multiplication by an amount equal to the first term $x$ of the approximate decomposition. Each left shift of one position corresponds to multiplication by 2. So if the term $x$=8, the multiplicand S is left shifted three positions; if the term $x$=16, the multiplicand is left shifted four places.

In the second shift circuit, the multiplicand is left shifted by the number of positions necessary to accomplish multiplication by the amount of the second term $y$ in the approximate decomposition. The products of the shifting are added together or subtracted, depending on the sign in the approximate decomposition, in an adder. The output of the adder is a number which represents the fixed point multiplicand and the approximate decomposition of the mantissa of the floating point multiplier.

The number of positions shifted by each left shift circuit, and whether the shift products are added or subtracted, are controlled by a set of control signals provided by certain decode logic circuitry. This decode logic determines the necessary operations through analysis of the mantissa terms $a_1$ through $a_k$. For the example given, if the terms $a_1$ and $a_2$ respectively are 0 and 1, the decode logic provides control signals directing; (a) a left shift by three places in the first shift circuit (i.e., multiplication by 8), (b) a left shift of one place in the second shift register (i.e., multiplication by 2), and (c) addition of the shift products. This implements the approximate decomposition of Table II for both values ($E$=10 or $E$=11) of the mantissa having values $a_1$=0, $a_2$=1. The mantissa term $a_o$ is always 1 for C 0, and so is not used by the decode logic.

To obtain the final multiplication product X=SC, the output of the adder is shifted by an amount equal to the power J of the floating point multiplier. This is performed in appropriate shift circuitry which receives the values $j_0$ through $j_i$. If J is positive or equal to zero, the sum from the adder is left shifted; if J is negative the adder output is right shifted by the shift circuitry. The output of this shift circuitry is the desired product X.

As discussed above, a numerical error is introduced by the inventive multiplier into certain calculations. The percentage error readily can be determined. For example, if the decimal equivalent of the mantissa is $E$=11, the error produced by assuming the mantissa to be $E'$=10 is $$\text{error} = (S \times E)/(S \times E') = (S \times 10)/(S \times 11) = 0.909$$

which corresponds to an error of about −9%. When the multiplier is used in a computor organ to carry out multiplication of a sin value by the harmonic coefficient, the introduced error will slightly alter the amplitude of the corresponding Fourier component.

In the above case, the error in decibels is given by $$\text{db error} = 20 \log_{10} (S \times 10)/(S \times 11) = -0.84 \text{db}$$

which is a sufficiently small error so that no difference in tonal quality will be detected by the listener.

BRIEF DESCRIPTION OF THE DRAWINGS

A detailed description of the invention will be made with reference to the accompanying drawings wherein like numerals designate corresponding elements in the several figures. These drawings, unless described as diagrammatic or unless otherwise indicated, are to scale.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

In the inventive multiplier circuit 10 (FIG. 1), the fixed point multiplicand S is supplied in parallel binary form via a channel 11 to first and second left shift circuits 12 and 13. In these circuits the multiplicand is shifted respectively by a number of places corresponding to the power of two in the approximate decomposition (Table II) of the mantissa of the floating point multiplier C. The extent of left shifting in each of the circuits 12 and 13 is controlled by decode logic 14 which receives the mantissa of the multiplier C in parallel binary form via a channel 15.

Figure 1:
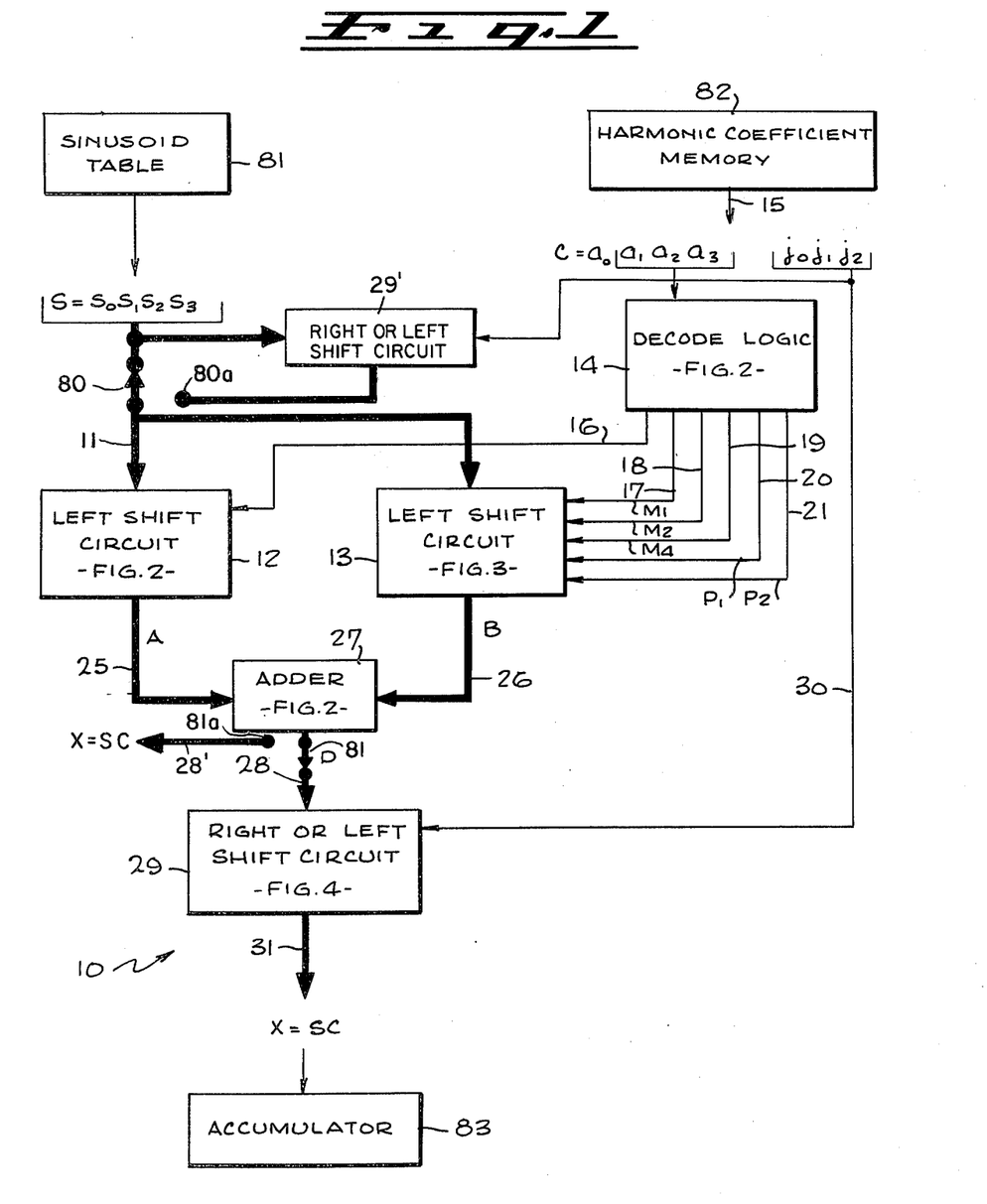
FIG. 1 is an electrical block diagram of the inventive multiplier circuit.

As described in detail below in conjunction with FIG. 2, the decode logic 14 provides appropriate control signals via a set of lines 16 through 21 that establish the extent of left shifting in each of the circuits 12 and 13. The shift products A and B from the respective circuits 12 and 13 are supplied via a pair of channels 25 and 26 to an adder 27. If the approximate decomposition for the multiplier mantissa is the sum of these products, the corresponding addition is performed by the adder 27.

If the approximate decomposition is the difference of the two shift products, then the left shift circuit 13 will provide the two's complement of the shift product B via the channel 26 to the adder 27. As a result, the output of the adder 27 will be the difference (A−B). The control signals from the decode logic 14 direct whether the shift product B or the two's complement thereof is supplied to the adder 27. Alternatively a subtractor can be used instead of the adder 27, without supplying the two's complement from the left shift circuit 13.

The output D of the adder 27 is provided via a channel 28 to a shift circuit 29. There it is shifted by a number of places corresponding to the power J of the floating point multiplier C. This power J is supplied to the circuit 29 in parallel binary form via a channel 30. The output of the shift circuit 29 is the multiplication product X=SC. This product is supplied for external utilization in parallel binary form via a channel 31.

Figure 2:
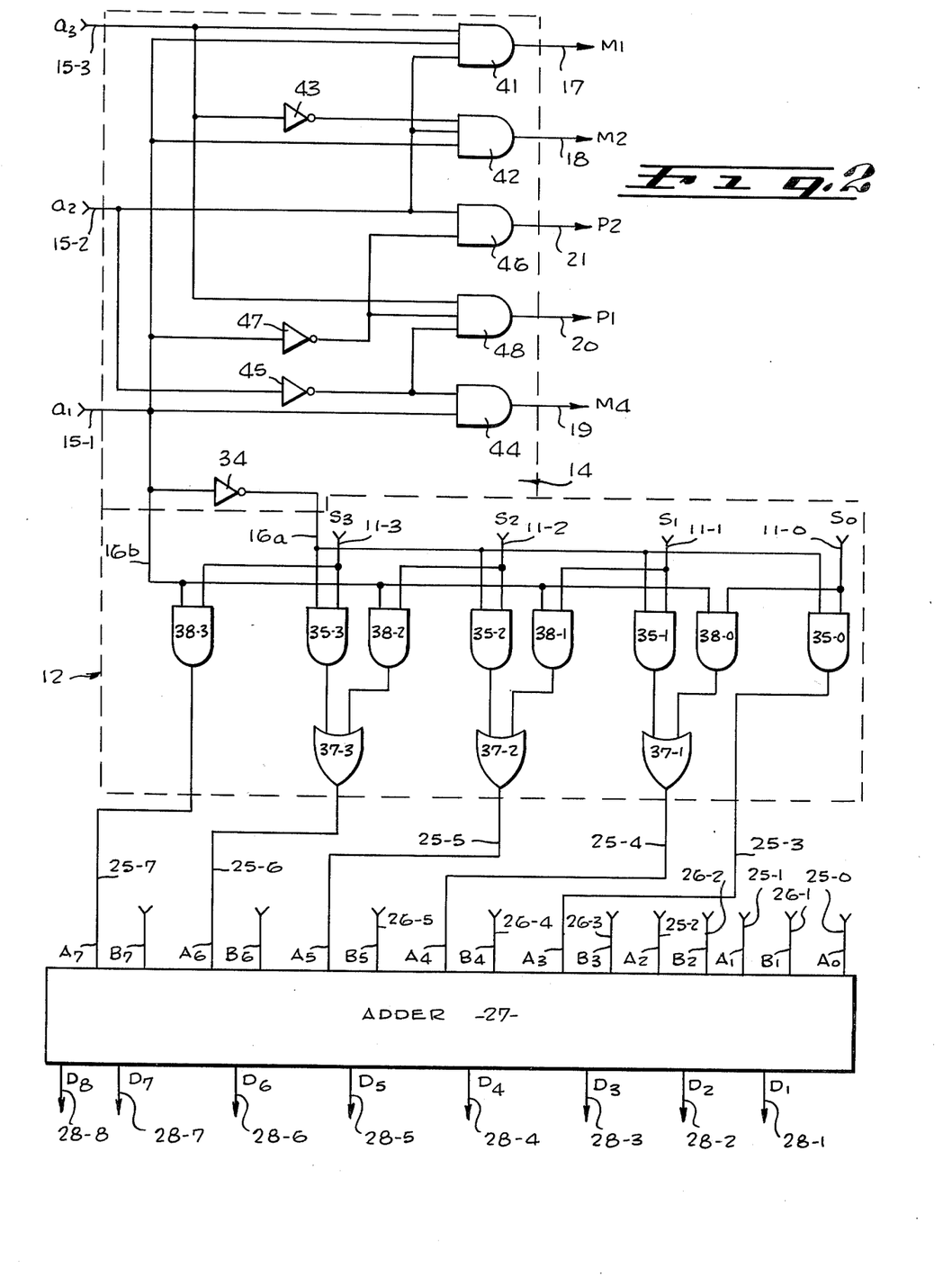
FIG. 2 is an electrical schematic diagram of the decode logic and first left shift circuitry used in the multiplier of FIG. 1.
Figure 3:
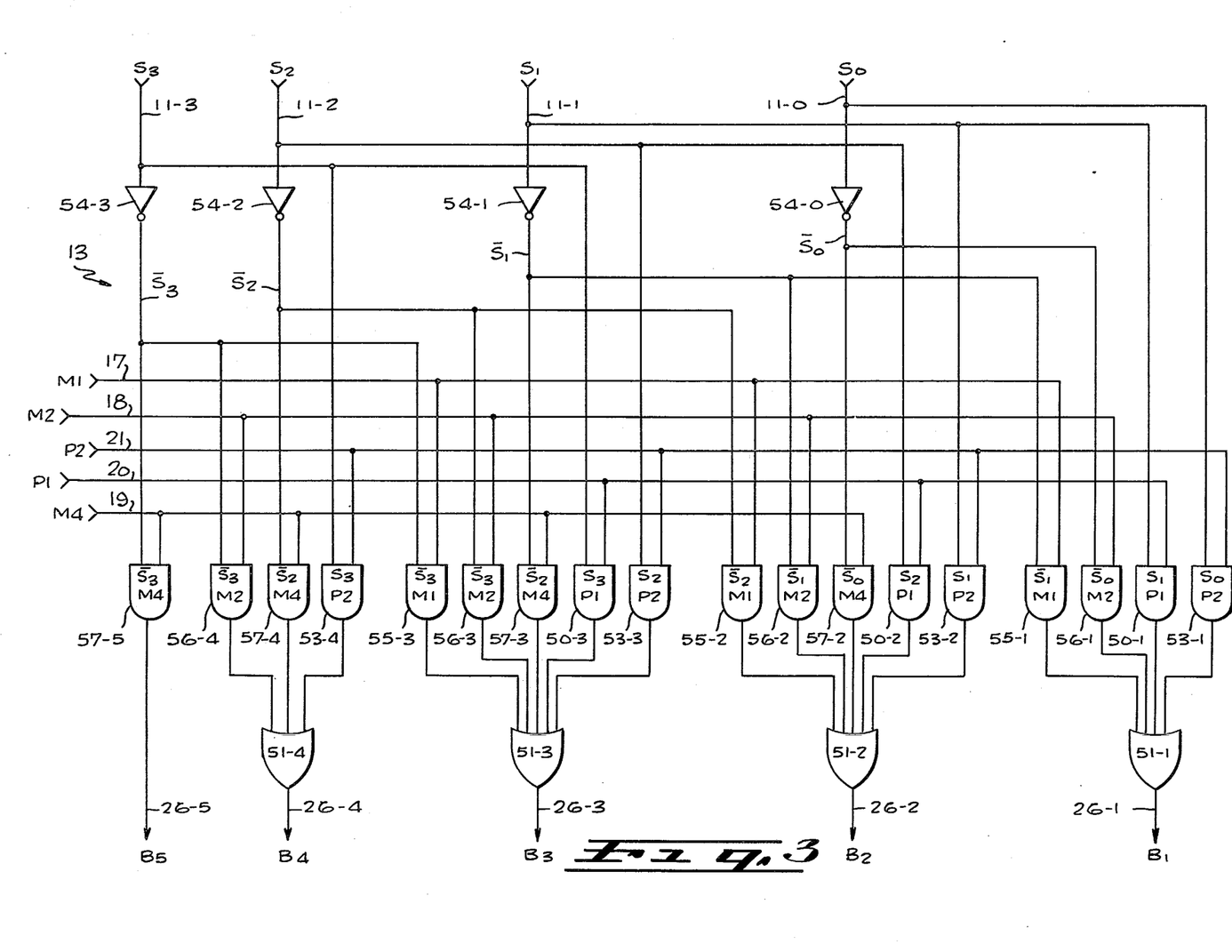
FIG. 3 is an electrical schematic diagram of the second left shift circuitry used in the multiplier of FIG. 1
Figure 4:
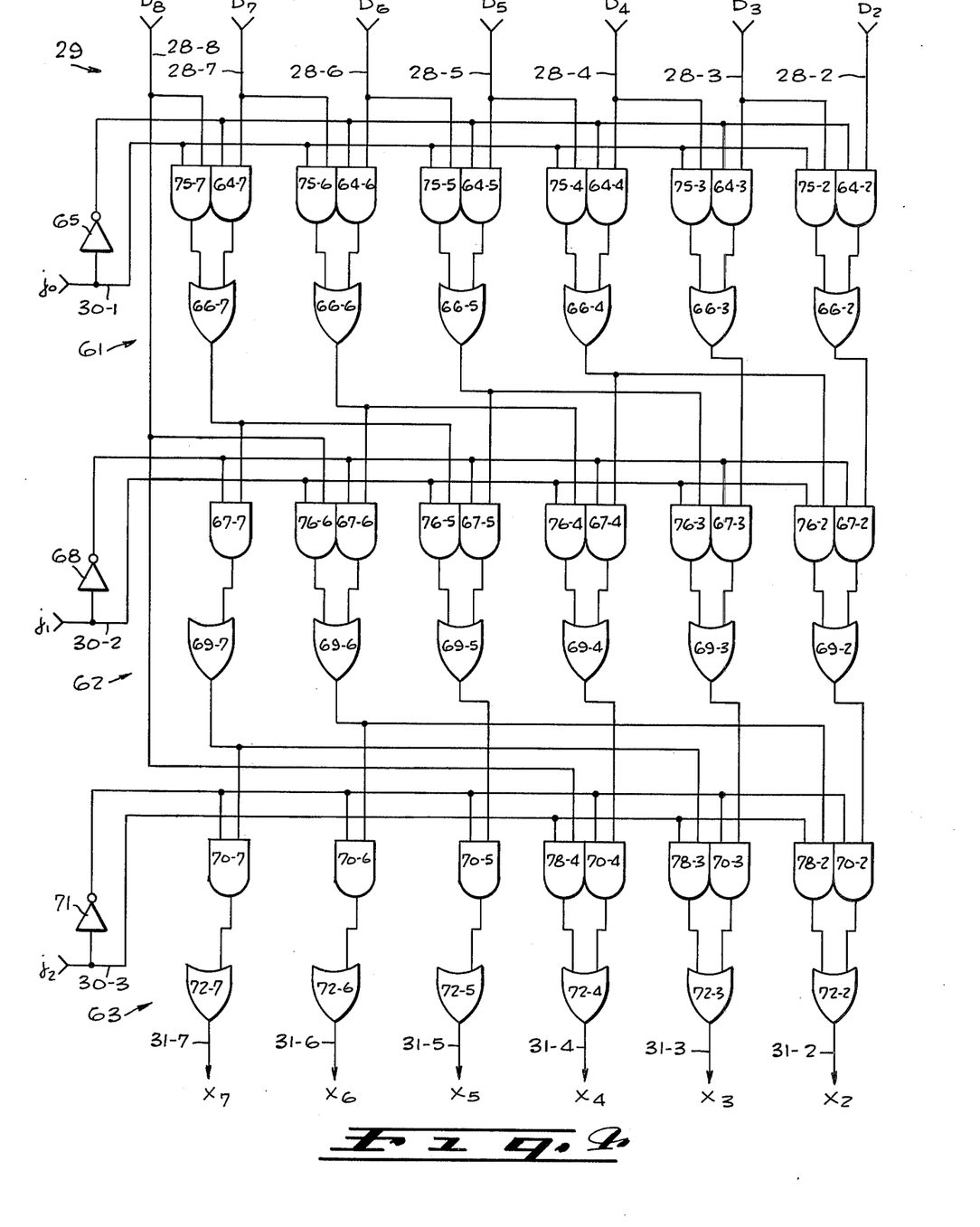
FIG. 4 is an electrical schematic diagram of illustrative right shift circuitry used in the multiplier of FIG. 1.

The exemplary circuitry of FIGS. 2, 3 and 4 is depicted for a fixed point multiplicand S in the form of equation 6 and for a floating point multiplier C in the form set of equation 7 and having a negative power J. The circuitry readily can be modified for operation with multiplier and multiplicand values having more or fewer bits, or for a multiplier having a positive power J.

In FIG. 2, the left shift circuit 12 receives the four bits $s_0, s_1, s_2, s_3$ of the fixed point multiplicand S via respective lines 11-0 through 11-3. This 4-bit parallel number is left shifted by either three or four positions, depending on whether the term $a_1$ in the floating point mantissa is 0 or 1. In the former case, the signal on the $a_1$ line 15-1 will be low. As a result an inverter 34 will provide a high signal on a control line 16a which conditions the circuit 12 to left shift the multiplicand by three places so as to accomplish multiplication by 8. Alternatively, when $a_1=1$, the signal on the line 15-1, and hence the signal on a control line 16b to the circuit 12, is high. This signal conditions a left-shift of four places, corresponding to multiplication by 16.

In the left shift circuit 12, the signal on the line 16a enables a set of four AND gates 35-0 through 35-3. When enabled, the gate 35-0 supplies the first fixed point bit $s_0$ to the adder 27 via a line 25-3 associated with the 4th bit position $A_3$ of the shift product A. Similarly, the enabled AND gates 35-1 through 35-3 supply the respective bits $s_1$ through $s_3$ via respective OR gates 37-1 through 37-3 to the respective shift product lines 25-4 through 25-6. Thus e.g., the multiplicand bit $s_3$ is shifted to the $A_6$ position in the shifted output of the circuit 12.

Left shifting by four positions takes place in an analogous manner. The high signal on the line 16b enables a set of AND gates 38-0 through 38-3. These supply the multiplicand S bits directly, or via the OR gates 37-1 through 37-3, to the respective output lines 25-4 through 25-7. The requisite shift is accomplished. Zero-valued inputs are provided to the adder 27 on the lines 25-0 through 25-2 associated with the bits $A_0$ through $A_2$ of the shift product A.

Control signals for directing the operation of the left shift circuit 13 are provided by the decode logic 14 which receives the floating point mantissa bits $a_1, a_2, a_3$ via the respective lines 15-1 through 15-3. Depending on the value of these bits, either no control signal or one of five possible control signals is generated. These are listed in the following Table III.

TABLE III

| Control Signal | Mantissa Value | | | Number of Left Shift Positions | Add/Subtract |
|---|---|---|---|---|---|
| | $a_1$ | $a_2$ | $a_3$ | | |
| M1 | 1 | 1 | 1 | no shift | subtract |
| M2 | 1 | 1 | 0 | 1 position | subtract |
| M4 | 1 | 0 | — | 2 positions | subtract |
| P1 | 0 | 0 | 1 | no shift | add |
| P2 | 0 | 1 | — | 1 position | add |
| no signal | 0 | 0 | 0 | no shift | not added |

By way of example, the control signal M1 is produced on the line 17 when all three bits $a_1, a_2, a_3$ are 1. In this case, high signals appear on the lines 15-1, 15-2 and 15-3 to provide concurrent inputs to a three input AND gate 41. This produces the M1 signal which, as described below in conjunction with FIG. 3, causes the fixed point number S not to be shifted in the circuit 13, but to be directly subtracted from the shift product A from the circuit 12.

The M2 signal is produced by an AND gate 42 which receives as two of its inputs the signals $a_1$ and $a_2$. The third input to the gate 42 is from an inverter 43 connected to receive the $a_3$ signal. With this arrangement, the M2 signal will appear on the line 18 whenever the bits $a_1=1$, $a_2=1$ and $a_3=0$. The M4 signal is produced on the line 19 whenever the values $a_1=1$ and $a_2=0$ respectively, regardless of the value of $a_3$. To this end, a two-input AND gate 44 receives the $a_1$ signal as one of its inputs. The other input is supplied from an inverter 45 connected to the $a_2$ signal line 15-2. Similarly, the P2 signal is provided on the line 21 whenever the values $a_1=0$ and $a_2=1$ respectively, regardless of the value of $a_3$. This is implemented by a two-input AND gate 46. One input to the gate 46 is directly from the $a_2$ line 15-2, the other input is from an inverter 47 that is connected to the $a_1$ line 15-1.

The P1 signal is supplied on the line 20 by a three-input AND gate 48. This gate receives as a first input the signal $a_3$ from the line 15-3, and also receives the outputs of the inverters 45 and 47. When the mantissa values $a_1=0$, $a_2=0$ and $a_3=0$, none of the control signals are produced.

The control signals from the logic 14 are supplied to the left shift circuit 13 as shown in FIG. 3. This circuit 13 carries out the operations listed in Table III above. For example, when the P1 control signal is present on the line 20, no shifting occurs. To this end, the P1 signal enables a set of AND gates 50-1 through 50-3 to supply the respective fixed point bits $s_1, s_2, s_3$ via respective OR gates 51-1 through 51-3 to the respective lines 26-1 through 26-3. These lines are connected to the respective $B_1, B_2$ and $B_3$ inputs to the adder 27.

The P2 signal causes a left shift of one position in the circuit 13. To this end, the P2 signal on the line 21 enables a set of four AND gates 53-1 through 53-4 to provide signals representing $s_0$ through $s_3$ via the OR gates 51-1 through 51-4 to the respective output lines 26-1 through 26-4. In this manner, the input $s_0$ bit is transferred to the $B_1$ output line, the $s_1$ bit is transferred to the $B_2$ output line and so forth. The requisite left shift is accomplished.

The M1, M2 and M4 signals all direct both a left shift in the circuit 13 and subtraction (i.e. addition of the two's complement) of the resultant shift product B from the output A of the other left shift circuit 12. To this end, each of the signals M1, M2 and M4 direct the two's complement of the fixed point multiplicand S to be supplied to the appropriate output lines. The complement is obtained by using a set of inverters 54-0 through 54-3 connected to receive the respective bits $s_0$ through $s_3$. The resultant complemented bits are applied to the appropriate shifted output lines 26-1 through 26-5. When the M1 signal is present, the inverted bits $\overline{s_1}$ through $\overline{s_3}$ are supplied via the respective AND gates 55-1 through 55-3 to the respective output lines $B_1$ through $B_3$. As required by Table III, the multiplicand S thus is not shifted in the circuit 13, however the two's complement is supplied to the adder 27. Thus the output of the adder 27 is the difference between the shift product A obtained from the left shift circuit 12 and the unshifted multiplicand, exactly as required by the approximate decomposition of Table II.

Left shifting of the two's complement bits $\overline{s_0}$ through $\overline{s_3}$ by one and two places respectively is accomplished upon occurrence of the M2 and M4 control signals. A shift of one place is accomplished by a set of AND gates 56-1 through 56-4 enabled by the M2 signal. A shift of two places is accomplished by a set of AND gates 57-2 through 57-5 enabled by the M4 control signal.

The complete logic for the $B_4$ through $B_7$ signals is:

$$B_4 = P_1S_3 + P_2S_3 + M_1\overline{S_3} + M_2\overline{S_3} + M_4\overline{S_3}$$
$$B_5 = P_1S_3 + P_2S_3 + M_1S_3 + M_2S_3 + M_4S_3$$
$$B_6 = B_5 \quad B_7 = B_5$$

The adder 27 (FIGS. 1 and 2) is a conventional parallel adder and may be implemented using an integrated circuit such as the Signetics SIG 8268 gated full adder or the Texas Instrument Company Type T1 SN 7483 binary full adder. The adder 27 sums the shift products A and B and provides the sum $D = A + B$ in binary form on the output lines 28-1 through 28-8 for the respective bits $D_1$ through $D_8$.

In the case where the power J of the floating point multiplier C is in the form of equation 5 and is negative ($J < 0$), the sum B is right shifted in the circuit 29 (FIG. 4) by a number of places equal to J. This is accomplished by a first set of logic gates 61 associated with the power bit $j_0$, a second set of logic gates 62 associated with the bit $j_1$, and a third set of logic gates 63 associated with the bit $j_2$. The logic gates 61 introduce a right shift of one position of the $j_0$ bit is 1, and introduced no shift if $j_0 = 0$. The logic gates 62 cause a right shift of two places if $j_1 = 1$ and introduce no shift if $j_1 = 0$. The logic gates 63 introduce a shift of four places if $j_2 = 1$, and introduce no shift if $j_2 = 0$. Additional like logic (not shown) may be used for the terms $j_3, j_4 \ldots j_i$ to introduce right shifts equal to the corresponding power of two for that term.

The logic 61 includes a first set of AND gates 64-2 through 64-7 which are enabled by the output of an inverter 65 when $j_0 = 0$. When so enabled, these gates supply the respective bits $D_2$ through $D_7$ from the respective lines 28-2 through 28-7 via respective OR gates 66-2 through 66-7 to a set of AND gates 67-2 through 67-7 in the logic 62. These AND gates 67-2 through 67-8 likewise are enabled when $j_1 = 0$ by the output of an inverter 68. The signals from these enabled gates are supplied via respective OR gates 69-2 through 69-7 to the corresponding AND gates 70-2 through 70-7 in the logic 63. Again, these AND gates 70-2 through 70-7 are enabled when $j_2 = 0$ by the output of an inverter 71. The outputs of the AND gates 70-2 through 70-7 are supplied via OR gates 72-2 through 72-7 to the respective output lines 31-2 through 31-7 corresponding to the respective output bits $X_2$ through $X_7$ of the multiplication product X. In this manner, it can be seen that if the power $J = 0$ so that $j_0, j_1$ and $j_2$ all are zero, then no shift of the adder 27 output D occurs. That is, the bits $D_2$ through $D_7$ from the adder 27 are supplied directly to the corresponding output lines $X_2$ through $X_7$.

If $j_0 = 1$ and $j_1$ and $j_2$ both are zero, a right shift of one place occurs in the circuit 29. To this end, the high $j_0$ signal on the line 30-1 enables a set of AND gates 75-2 through 75-7 which gate the respective data bits $D_3$ through $D_8$ to the respective OR gates 66-2 through 66-7. From there the signals are communicated as described above to the respective output lines 31-2 through 31-7. The input bit $D_3$ from the adder 27 appears as the $X_2$ output, and the $D_8$ bit appears as the $X_7$ output. The right shift of one place is accomplished.

If in the power J the terms $j_2 = j_1 = 1$ and $j_0 = 0$, the circuit 29 performs a shift of two places. To accomplish this, the high $j_1$ signal on the line 30-2 enables a set of AND gates 76-2 through 76-6. The enabled AND gates 76-2 through 76-5 pass the signals from the respective OR gates 66-4 through 66-7 to the respective OR gates 69-2 through 69-5. The enabled AND gate 76-6 provides the $D_8$ signal from the line 28-8 to the OR gate 69-6. Since the AND gate 67-7 is disabled, a zero output is obtained both from the AND gate 67-7 and from the OR gate 69-7. Since both $j_0$ and $j_2$ are zero, no shift occurs in the logic 61 or 63. Accordingly, with $j_1 = 1$, the $D_4$ bit is supplied to the output line 31-2 as the bit $X_2$. The signal path is from the line 28-4 through the AND gate 64-4, the OR gate 66-4, the AND gate 76-2, the OR gate 69-2, the AND gate 70-2 and the OR gate 72-2 to the output line 31-2. Similarly, the other bits $D_5$ through $D_8$ are shifted two places and appear as the output bits $X_3$ through $X_6$ respectively. The output $X_7$ is low, representing a binary zero.

To accomplish a shift of four places when only $j_2 = 1$, the high $j_2$ signal on the line 30-3 enables a set of AND gates 78-2 through 78-4. The enabled AND gates 78-2 and 78-3 supply the outputs of the OR gates 69-6 and 60-7 respectively via the OR gates 72-2 and 72-3 to the output lines 31-2 and 31-3. The enabled AND gate 78-4 supplies the $D_8$ signal from the line 28-8 via the OR gate 72-4 to the output line 31-4. If $j_0 = 0$ and $j_1 = 0$, the result is that the data bits $D_6$ through $D_8$ appear as the output bits $X_2$ through $X_4$, representing a right shift of four places. Since the AND gates 70-5 through 70-7 are disabled when $j_2 = 1$, zero outputs are obtained from both the AND gates 70-5 through 70-7 and from the OR gates 72-5 through 72-7. Accordingly, zero bits are provided on the lines $X_5$ through $X_7$.

If $j_0 = 1, j_1 = 1$ and $j_2 = 0$, a net right shift of three places occurs. A shift of one place is introduced by the logic 61 and an additional shift of two places is introduced by the logic 62. No shift occurs in the logic 63. In general, the number of places that are right shifted by the circuit 29 is determined by the value J. The output of the right shift circuit 29 represents the multiplier product X·SC.

The only delay through the inventive multiplier 10 is whatever logic time it takes to enable the various gates employed therein. Unlike prior art multipliers, there is no need to perform repetitive addition and shifting, operations wich require many clock cycles. The result is a very fast multiplier which can operate in as little as a single clock cycle.

For floating point multipliers C having powers J that are greater than zero (i.e., J is positive), a left shift is performed by the circuit 29 (FIG. 1) to obtain the multiplication product X. Such ledt shifting by a number of places corresponding to the value of J advantageously is accomplished by circuitry that is the mirror image of that shown in FIG. 4. In such circuitry, e.g., the line 28-3 associated with the bit $D_3$ would be connected to the AND gate 75-4 instead of 75-2. Such circuitry would perform a left shift of one place if $j_o=1$, of two places if $j_1=1$, etc.

For fixed point multiplicands S ≤ O having the form of equation 3, left shift circuitry like that of FIGS. 2 and 3 again is used. The last significant bit is supplied to the input line 11-0 and the most significant bit is provided to the input line 11-3. For example, in the case where $$S = s_o 2^o + s_1 2^{-1} + s_2 2^{-2} + s_3 2^{-3} \qquad \text{(Eq. 8)}$$

the bit $s_3$ is supplied to the line 11-0 and the bit $s_o$ is supplied to the line 11-3. Of course, for a particular embodiment the decimal point is appropriately situated.

For floating point multipliers C (equation 3) in which k>3, the mantissa is decomposed in a manner simular to Table II above. Thus for k=4, the decomposition and approximate decomposition into sums of differences of numbers x and y that are powers of two are set forth in Table IV below.

TABLE IV

| Mantissa in Binary | | | | | Decimal Equivalent (E) of Mantissa | Exact Decomposition of Decimal Equivalent | Approximate Decomposition of Decimal Equivalent |
|---|---|---|---|---|---|---|---|
| $a_o$ | $a_1$ | $a_2$ | $a_3$ | $a_4$ | | | x + y |
| 1 | 0 | 0 | 0 | 0 | 16 | 16 + 0 | 16 + 0 |
| 1 | 0 | 0 | 0 | 1 | 17 | 16 + 1 | 16 + 1 |
| 1 | 0 | 0 | 1 | 0 | 18 | 16 + 2 | 16 + 2 |
| 1 | 0 | 0 | 1 | 1 | 19 | 16 + 3 | *16 + 2 |
| 1 | 0 | 1 | 0 | 0 | 20 | 16 + 4 | 16 + 4 |
| 1 | 0 | 1 | 0 | 1 | 21 | 16 + 5 | *16 + 4 |
| 1 | 0 | 1 | 1 | 0 | 22 | 16 + 6 | *16 + 4 |
| 1 | 0 | 1 | 1 | 1 | 23 | 16 + 7 | *16 + 8 |
| 1 | 1 | 0 | 0 | 0 | 24 | 32 − 8 | 32 − 8 |
| 1 | 1 | 0 | 0 | 1 | 25 | 32 − 7 | *32 − 8 |
| 1 | 1 | 0 | 1 | 0 | 26 | 32 − 6 | *32 − 8 |
| 1 | 1 | 0 | 1 | 1 | 27 | 32 − 5 | *32 − 4 |
| 1 | 1 | 1 | 0 | 0 | 28 | 32 − 4 | 32 − 4 |
| 1 | 1 | 1 | 0 | 1 | 29 | 32 − 3 | *32 − 4 |
| 1 | 1 | 1 | 1 | 0 | 30 | 32 − 2 | 32 − 2 |
| 1 | 1 | 1 | 1 | 1 | 31 | 32 − 1 | 32 − 1 |

Again the asterisk indicates an approximate decomposition.

As an alternative embodiment, the right or left shifting in accordance with the power J may be accomplished prior to left shifting in the circuits 12 and 13. To this end, a pair of switches 80 and 81 are switched from the positions shown in FIG. 1 to the alternative positions 80a and 81a. As a result, the fixed point multiplier S itself is supplied to a right or left shift circuit 29' (like the circuit 29 of FIG. 4), and the resultant shifted value of S is provided to the left shift circuits 12 and 13. The output of the adder 27 then is supplied via a line 28' as the desired product X=SC The inventive multiplier 10 advantageously is employed as the "harmonic amplitude multiplier" in the computor organ disclosed in the above mentioned U.S. Pat. No. 3,809,786 to Deutsch. In such embodiment, the fixed point multiplicand S would be supplied from a sinusoid table 81 (FIG. 1) in that computor and the floating point multiplier C would be supplied from a harmonic coefficient memory 82. The product X would be provided to an accumulator 83.

Thus the multiplier 10, the sinusoid table 81, the harmonic coefficient memory 82 and the accumulator 83 would correspond to the like-named components respectively numbered 33, 29, 15 and 16 in the U.S. Pat. No. 3,809,786. The components then cooperate in the synthesis of musical tones in accordance with equation 1, all as described in that patent.

As used herein, the term "channel" refers to a set of wires or lines that together transmit a number in parallel binary form. Ther terms "high" and "low" refer to signals on a single line that respectively represent a binary 1 and a binary 0.

Intending to claim all novel, useful and unobvious features shown or described, the applicants make the following claims:

1. A multiplier circuit for multiplying a binary fixed point multiplicand by a binary floating point multiplier, comprising:
   decode logic means, connected to receive the mantissa of said floating point multiplier, for providing control signals indicative of two binary numbers the sum of which is approximately equal to the value of said mantissa, each of said two numbers being a power of two,
   a first left shift circuit means connected to said decode logic means and responsive to one of the control signals therefrom, for left shifting said multiplicand by a number of places corresponding to the first of said two numbers,
   a second left shift circuit connected to said decode logic means and responsive to other of the control signals therefrom, for left shifting said multiplicand by a number of places corresponding to the second of said two numbers,
   an adder, connected to both said first and second left shift circuits, for adding together the shift products thereof, and
   another shift circuit for shifting a binary number by a number of places corresponding to the power of said floating point multiplier, said shifting being to the right for a negative power and to the left for a positive power, said other shift circuit being connected to said adder for shifting the sum received from said adder, the shifted output of said other shift circuit being the multiplication product.

2. A multiplier circuit according to claim 1 utilized in an electronic musical instrument of the type having sinusoid table means for providing a fixed point multiplicand representing a sinusoid value and having harmonic coefficient memory means for providing a floating point multiplier representing a harmonic coefficient that specifies the relative amplitude of each constituent Fourier component of a musical waveshape, said sinusoid table means being connected to said first left shift circuit means to provide said fixed point multiplicand thereto, said harmonic coefficient memory means being connected to said decode logic means to provide the mantissa of said floating point multiplier thereto and connected to said other shift circuit for providing the power of said floating point multiplier thereto, the multiplication product obtained from said other shift circuit being a number indicative of the amplitude contribution of the corresponding Fourier component to the amplitude of the musical waveshape at a certain sample point specified by said sinusoid value, said instrument having an accumulator, the output of said other shift circuit being connected to provide said multiplication product to said accumulator which sums the like multiplication products for a set of Fourier components to obtain said waveshape sample point amplitude.

3. A multiplier circuit according to claim 1 wherein said adder is an add/subtract circuit wherein the shift products from said first and second left shift circuits are added when the second of said two binary numbers is positive and wherein the shift product from said second left shift circuit is subtracted from the shift product of said first left shift circuit when the second of said two binary numbers is negative.

4. A multiplier circuit according to claim 1 wherein the second of said two binary numbers is negative, and further comprising two's complement circuitry connected to said second left shift circuit and responsive to certain of said control signals, for providing the two's complement of the shift product of said second shift circuit to said adder.

5. A multiplier circuit according to claim 4 wherein said floating point multiplier C is of the general form $C=(a_0 2^0 + a_1 2^{-1} + a_2 2^{-2} + \ldots + a_k 2^{-k})2^J$ where $a_0, a_1, \ldots a_k$ each are binary bits having the value 0 or 1, where $a_0=1$ except when $C=0$, wherein J is said power, and wherein said decode logic means provides said control signals in response to the values of $a_0$ through $a_k$.

6. A multiplier circuit according to claim 5 wherein said decode logic means includes first control circuitry for providing said one control signal in response to the value of said $a_1$ bit, and second control circuitry for providing said other control signals in response to the values of said $a_1$ through $a_k$ bits.

7. A multiplier circuit according to claim 6 wherein said one control signal has a first binary value when $a_1=1$ and has a second binary value when $a_1=0$, and wherein said certain of the control signals cause said complement circuitry to provide said two's complement when $a_1=1$ and not to provide said two's complement when $a_1=0$.

8. A multiplier circuit according to claim 7 wherein $k=3$, and wherein the following other control signals are provided by said logic means; an M1 control signal specifying no shift in said second left shift circuit when $a_1=1$, $a_2=1$ and $a_3=1$; an M2 control signal specifying a left shift of one position in said second shift circuit when $a_1=1$, $a_2=1$ and $a_3=0$; an M4 control signal specifying a left shift of two positions in said second shift circuit when $a_1=1$ and $a_2=0$ regardless of the value of $a_3$; a P1 signal specifying no shift in said second shift circuit when $a_1=0$, $a_2=0$ and $a_3=1$; and a P2 signal specifying a left shift of one position in said second shift circuit when $a_1=0$ and $a_2=1$ regardless of the value of $a_3$; said M1, M2 and M4 control signals also causing said two's complement of the shift product to be supplied to said adder.

9. In a musical instrument of the type including generation means wherein a musical waveshape is synthesized by computing in real time the amplitudes at successive sample points of that waveshape, said waveshape amplitudes being converted to musical signals as the computations are carried out, each waveshape amplitude being computed by individually calculating the constituent Fourier components of that musical waveshape and summing these components, the relative amplitudes of said Fourier components being established by a set of harmonic coefficients stored in a first memory in the form of binary floating point numbers, said calculating comprising multiplying the harmonic coefficient for each Fourier component by a sinusoid value related to the waveshape sample point, said sinusoid values being obtained from a second memory storing such values in binary fixed point form, the improvement comprising:

a multiplier for performing said multiplication, said multiplier being connected to receive said harmonic coefficient and said sinusoid value from said first and second memories respectively and to provide the multiplication product to an accumulator wherein said summing takes place, said multiplier including;

decode logic, receiving the mantissa of said floating point harmonic coefficient, for providing first and second sets of shift control signals respectively related to two numbers the sum of which is approximately numerically equal to said mantissa, each of said two numbers being a power of two, first and second left shift circuits for respectively shifting a fixed point number by a number of places corresponding to said two numbers, said circuits being connected to said decode logic to receive the respective first and second sets of shift control signals, an adder, connected to said first and second shift circuits, for algebraically summing the shift products of said shift circuits, and another shift circuit, receiving the power of said floating point harmonic coefficient and connected to shift a number by a number of positions and in a direction corresponding to the value and sign of said power respectively, said shift circuit being connected to receive said fixed point sinusoid value from said second memory and to provide the shifted value to said first and second shift circuits, the adder output being the multiplication product that is supplied to said accumulator.

10. In a musical instrument of the type including generation means wherein a musical waveshape is synthesized by computing in real time the amplitudes at successive sample points of that waveshape, said waveshape amplitudes being converted to musical signals as the computations are carried out, each waveshape amplitude being computed by individually calculating the constituent Fourier components of that musical waveshape and summing these components, the relative amplitudes of said Fourier components being established by a set of harmonic coefficients stored in a first memory in the form of binary floating point numbers, said calculating comprising multiplying the harmonic coefficient for each Fourier component by a sinusoid value related to the waveshape sample point, said sinusoid values being obtained from a second memory storing such values in binary fixed point form, the improvement comprising:

a multiplier for performing said multiplication, said multiplier being connected to receive said harmonic coefficient and said sinusoid value from said first and second memories respectively and to provide the multiplication product to an accumulator wherein said summing takes place, said multiplier including;

decode logic, receiving the mantissa of said floating point harmonic coefficient, for providing first and second sets of shift control signals respectively related to two numbers the sum of which is approximately numerically equal to said mantissa, each of said two numbers being a power of two, first and second left shift circuits for respectively shifting a fixed point number by a number of places corresponding to said two numbers, said circuits being connected to said decode logic to receive the respective first and second sets of shift control signals, an adder, connected to said first and second shift circuits, for algebraically summing the shift products of said shift circuits, and another shift circuit, receiving the power of said floating point harmonic coefficient and connected to shift a number by a number of positions and in a direction corresponding to the value and sign of said power respectively, said shift circuit being connected to receive the sum from said adder, the fixed point sinusoid values from said second memory being supplied directly to said first and second shift circuits, the output of said other shift circuit being the multiplication product that is supplied to said accumulator.

11. A multiplier circuit for multiplying a binary fixed point multiplicand by a binary floating point multiplier, comprising:

decode logic means, connected to receive the mantissa of said floating point multiplier, for providing control signals indicative of two binary numbers the sum of which is approximately equal to the value of said mantissa, each of said two numbers being a power of two, a first left shift circuit means connected to said decode logic means and responsive to one of the control signals therefrom, for left shifting said multiplicand by a number of places corresponding to the first of said two numbers, a second left shift circuit connected to said decode logic means and responsive to other of the control signals therefrom, for left shifting said multiplicand by a number of places corresponding to the second of said two numbers, an adder, connected to both said first and second left shift circuits, for adding together the shift products thereof, and another shift circuit for shifting a binary number by a number of places corresponding to the power of said floating point multiplier, said shifting being to the right for a negative power and to the left for a positive power, said other shift circuit being connected to the inputs of said first and second left shift circuits for shifting said fixed point multiplicand and for providing the shifted multiplicand to said first and second shift circuits, the output of said adder being the multiplication product.

* * * * *